July 30, 1946.　　P. P. WUERTZ ET AL　　2,404,820
LOADER
Filed June 21, 1944　　3 Sheets-Sheet 1
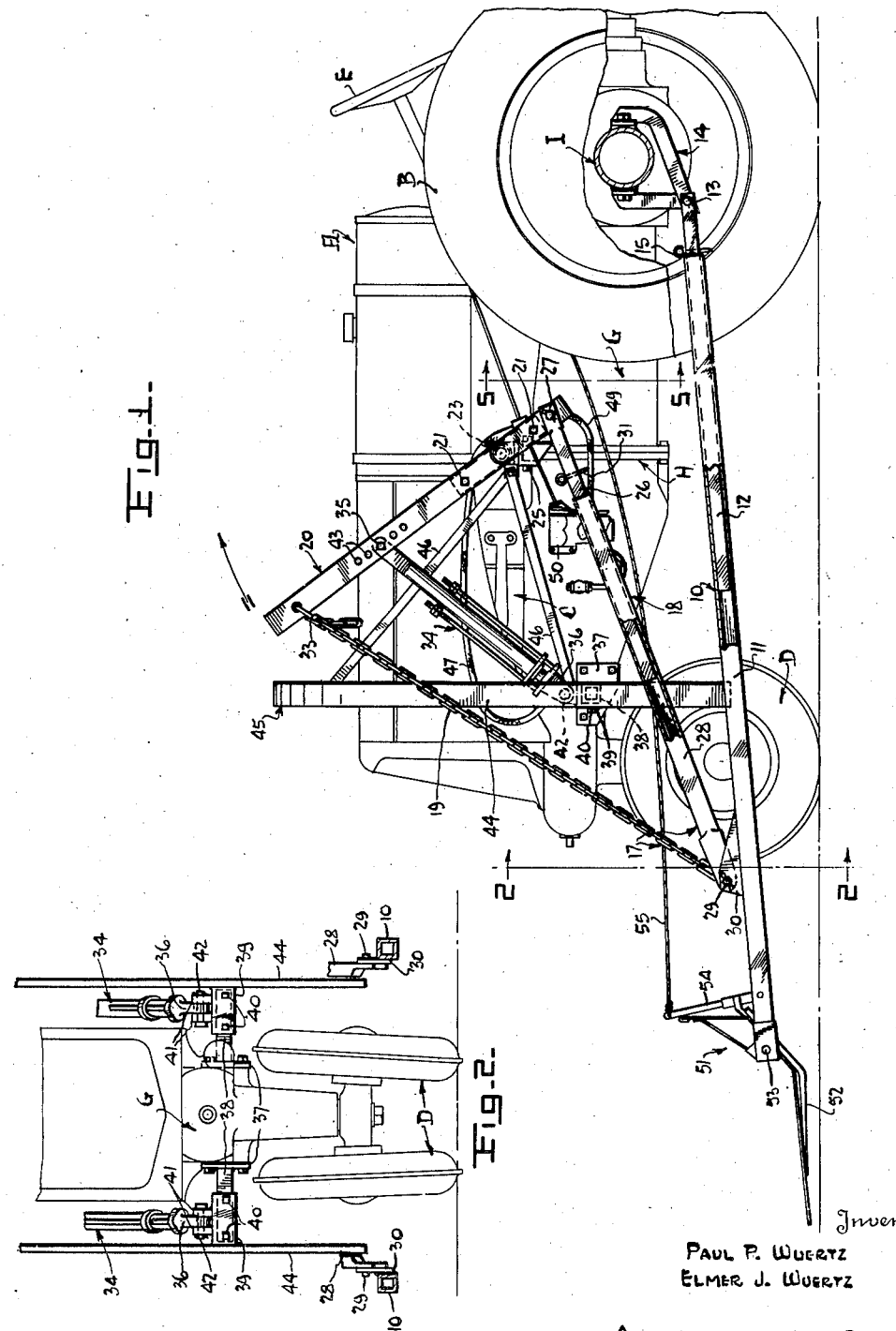
Inventors
PAUL P. WUERTZ
ELMER J. WUERTZ
By Carlsen + Hazle
Attorneys

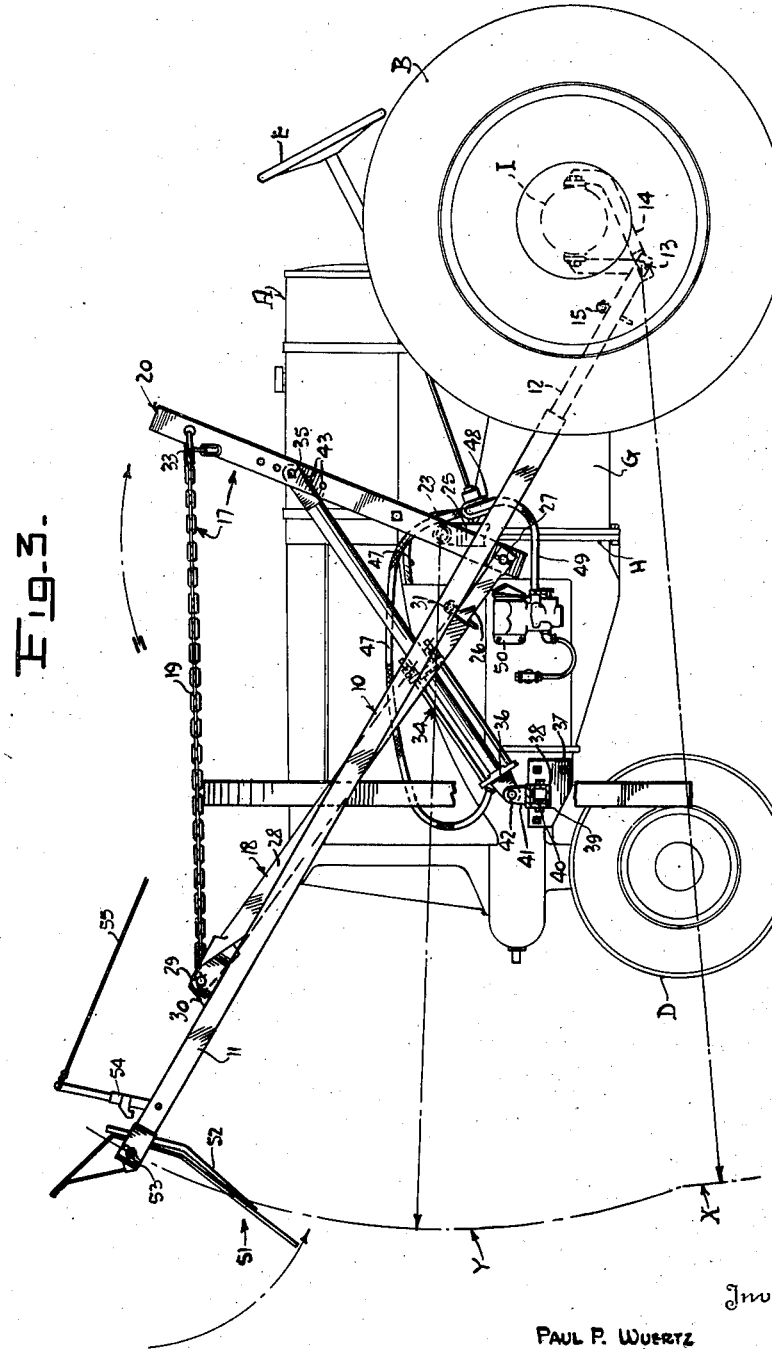

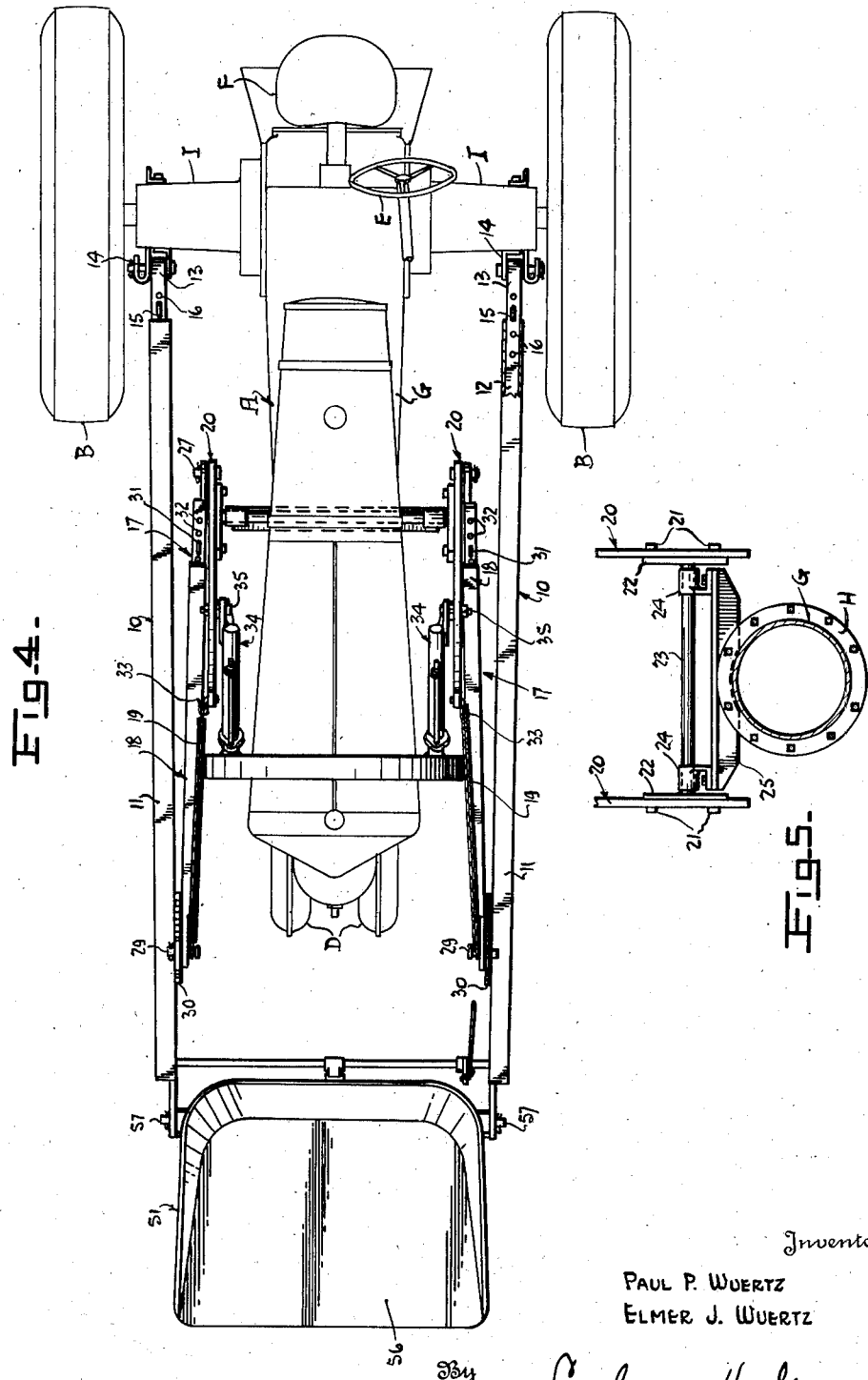

Patented July 30, 1946

2,404,820

UNITED STATES PATENT OFFICE 2,404,820

LOADER

Paul P. Wuertz, Melrose, and Elmer J. Wuertz, Paynesville, Minn., assignors to Minneapolis-Moline Power Implement Company, Minneapolis, Minn., a corporation of Delaware Application June 21, 1944, Serial No. 541,322

18 Claims. (Cl. 214—141)

1

This invention relates to improvements in tractor mounted loaders for use in loading and handling manure, dirt and similar materials.

The primary object of our invention is to provide a loader of this kind which is very simple, compact and readily installed on or removed from the tractor. Another object is to provide a loader having novel and exceedingly efficiently arranged operating means by which a powerful lift may be first applied to the load to break loose packed material, and then a forward and upward lift applied to raise the load to a desired elevation. Still another object is to provide a loader of this character wherein the various parts are so proportioned, and the weight so distributed, that the front end load on the tractor is kept as low as possible and the necessity for auxiliary support wheels for the loader completely eliminated.

These and other more detailed and specific objects will be disclosed in the course of the following specification, reference being had to the accompanying drawings, in which—

Fig. 1 is a side elevation, partially in section of our improved loader and the tractor, showing a manure fork as the load carrier and showing the fork in the lowered position.

Fig. 2 is a frontal sectional view taken substantially along the line 2—2 in Fig. 1.

Fig. 3 is a view similar to Fig. 1 but showing the load raised.

Fig. 4 is a plan view of the loader as shown in Fig. 1, but showing a dirt scoop installed in place of the manure fork.

Fig. 5 is a fragmentary sectional view along the line 5—5 in Fig. 1.

Referring now more particularly and by reference characters to the drawings, A designates generally a conventional tractor of the row crop type having widespread rear traction wheels B powered by an engine C and closely spaced forward wheels D which are steerable by a steering wheel E at the operator's station F. The tractor further includes a generally longitudinally disposed housing G which contains engine and transmission parts and which includes separate sections two of which are joined by the bolt ring or flange structure H. The axle connecting the rear wheels B is enclosed in a housing I.

Our loader comprises two substantially identical side frame structures, one at each side of the tractor, and including load carrying booms 10 which are disposed lengthwise alongside the tractor A, extending from the rear axle housing I forwardly beyond the front wheels D a substantial distance. Each boom 10 comprises two telescopically related tubular sections 11 and 12 and the inside section 12 is pivoted on a transverse axis at its rear end 13 upon a bracket structure 14 supported from the axle housing I. The forward ends of the booms are thus supported for upward and downward swinging movements in longitudinal planes. The outside sections 11 of the booms 10 may also move forwardly and rearwardly with respect to the inside section 12, the latter movement being limited by stop pins 15 which may be inserted through any one of a series of openings 16 in sections 12 to select the minimum overall length of the booms as the sections are telescoped or collapsed.

Arranged above the booms 10 are the triangular operating frames designated generally at 17. One side of each such frame 17 comprises a telescoping push bar 18, one side a lifting chain 19 and the third side an operating or oscillating lever or arm 20. The levers 20 are secured, as by bolts 21, to plates 22 carried by the ends of a transversely extending lifting roll or shaft 23, said roll 23 being journaled in bearings 24 (Fig. 5) secured to the ends of a cross beam 25 which is bolted upon the bolt ring H of transmission housing G. The levers 20 thus are supported and arranged to operate as a unit, swinging in upright longitudinal planes above, but inwardly of, the booms 10. The levers 20 are supported adjacent one end upon the roll 23 in such manner as to form a longer extension above the roll than below as clearly shown.

The push bars 18 are extended between lower ends of the levers 20 and forward end portions of the booms 10. Each bar 18 comprises a pair of telescopically assembled tubular sections, the inner rear section 26 being pivoted at 27 to the associated lever 20, while the outer, forward section 28 is pivoted at 29 to a bracket plate 30 welded to the boom 10 at an appropriate point. Collapsing or telescoping movement of the push bar sections 26 and 28 is limited by a stop pin 31 which may be inserted through any one of a series of openings 32 in the rear section to engage the rear end of forward section 28.

The lifting chains 19 are each connected at one end to the bolt or pin forming the pivot connection 29 between push bar 18 and boom 10 and at their other ends are adjustably connected to upper ends of the levers 20 by any suitable means, such as the hooks 33.

For oscillating the triangular operating frames 17 thus formed we provide at each side of the tractor a hydraulic jack or ram 34 each of which is of well known construction and comprises two telescoping parts one of which is pivotally connected at 35 to the adjacent lever 20 above the lifting roll 23 while the other is provided with an apertured ear 36 by which it is connected to the tractor A. For this purpose a mounting plate 37 is bolted at each side of the housing G above and immediately to the rear of the front wheels D and extending laterally from each plate is a support arm or beam 38 rigidly supported by the plate. An angle bar 39 is detachably secured on the forward and upper sides of the arm 38 by bolts 40 and on this bar is secured spaced bearing ears 41 between which is fitted the aforesaid ears of the jack 34. A pin 42 forms a pivot connection at this point and supports the jack for swinging movements in a plane parallel with that through which the associated lever 20 moves. A series of openings 43 in the levers 20 permits adjustment of the connection 35 according to the stroke of the jacks and the leverages desired as will be readily apparent.

Secured, as by welding, to the ends of the angle bars 39 are the upright legs or sides 44 of a guide member 45 of inverted U-shape which straddles the forward part of the tractor A. Said legs 44 are disposed inwardly of the push bars 18 but in position to guide the same in their up and down movements, preventing inward lateral displacement thereof. Suitable brace bars 46 as seen in Fig. 1 may be provided to rigidly brace the guide members 45 and ends of the angle bars 39.

The jacks are each supplied with fluid under pressure by a line 47 leading from a control device 48 of any suitable kind, fluid being supplied to the device 48 by a line 49 leading from a pump 50 located on the side of the tractor housing G. As here illustrated the pump 50 is similar to that disclosed in the Victor N. Albertson Patent No. 2,264,560 issued December 2, 1941, and takes oil from the crankcase of the tractor engine C for supplying the jacks 34. Obviously any other pressure source may be employed and when the fluid is admitted to the jacks they will elongate, urging the levers 20 in a rearward direction at their upper ends, while as the fluid is allowed to return the jacks will collapse allowing the levers to swing forwardly again.

The forward ends of the booms 10 support the load carrier designated generally at 51 which may be of any kind suitable to the work at hand. As shown in Figs. 1 and 3 the carrier 51 is a manure fork having forwardly directed fork fingers 52 and tiltably supported on a transverse horizontal axis upon pivots 53 at the forward ends of the booms. A latch 54 normally holds the fork in substantially horizontal position but by pulling on the trip rope 55 the latch may be released to permit the fork to tilt downwardly and forwardly to dump its load as seen in Fig. 3. As shown in Fig. 4 the load carrier 51 takes the form of a shovel or scoop 56 pivoted at 57 between forward ends of the booms 10.

Operation

When the load carrier 51 is lowered the parts assume about the position shown in Fig. 1, the jacks 34 being collapsed and the booms 10 angling downwardly and forwardly with their forward sections 11 butting against the stop pins 15. Now to pick up a load of manure or other material the tractor A may be driven forwardly to force the load carrier into the material, the rearward thrust being transmitted directly, by the booms 10, back to the rear axle of the tractor so that powerful force may be employed without undue strain on the lifting mechanism. As the carrier 51 is loaded it is raised by admitting fluid to the jacks 34 causing them to extend and oscillate the levers 20 in a rearward direction at upper ends.

The resulting lifting action actually has two cycles or phases. In setting up the loader in the down or loading position, the stop pins 31 for the push bars 18 are installed in one of the openings 32 in such position that the rear ends of forward sections 28 of the bars will substantially clear the pins as seen in Fig. 1. Thus space is provided by means of which the push bars may be permitted to collapse or telescope freely at first. Bearing this in mind it will be evident that the initial rearward swinging movements of upper ends of the levers 20 will result entirely in a pull being exerted on the chains 19 and an upward lifting effect on forward ends of the booms 10. The booms as they start to swing upwardly will thus oscillate about their rear end pivots 13 following the curved path indicated at X in Fig. 3. The nearly straight upward lifting movement powered by the pull of the chains 19 is very forceful and enables the load on the carrier 51 to be broken loose without difficulty, even if the material is very tightly packed and heavy.

During this preliminary direct power lift on the booms 10 the triangular frames comprising the push bars 18, chains 19 and levers 20 of course each oscillate as a body. As the carrier reaches the upper limit of its travel on the arc X it will be found that the pivots 27 at the rear ends of the push bars have, due to forward movements of the lower ends of the lever 20, traveled forwardly with respect to the pivots 29 at forward ends of the bars to the point that the push bars have collapsed or telescoped until their forward sections 28 are stopped by the pins 31. Now the lifting movement enters its second phase. As this occurs the push bars 18 are rigid lengthwise and continuation of the oscillation of the levers 20 not only now pulls upon the chains 19 to swing the booms 10 upwardly but further causes the push bars to exert forward thrust forces upon the booms. This action causes the booms to extend in length, their forward sections 11 sliding forwardly upon their inner rear sections 12 away from the stop pins 15 as seen in Fig. 3. Actually the load carrier 51 now travels on an arc Y (Fig. 3) the radius of which is centered about the axis of the lifting roll 23, or in other words, about the pivot axis for the triangular frames made up of the parts 18, 19 and 20. The effect of this shifting of the pivots (from 13 to 23) for the carrier is to present the otherwise pronounced tendency of the load carrier to swing rearwardly as it rises to a substantial height as would occur were the booms 10 of fixed length. The forward projection of the forward ends of the booms, as a result of the forward thrust of the push bars 18, in fact causes the raised load to stand well forward of the tractor as shown in Fig. 3, which greatly facilitates its dumping upon a wagon, truck or spreader as will be obvious.

The positions of the stop pins 15 and 31 as well as the length of the chains 19 may be readily adjusted to vary the forward projection of the load as it rises, as well as to vary the leverages involved according to the loads being handled. Such adjustments are interrelated but readily made on the job.

As the load carrier is lowered the aforesaid actions of course proceed in reverse until the carrier reaches loading position again. It will be noted that the carrier is closely spaced to the forward end of the tractor when lowered and that the chains transmit the weight well to the rear of the tractor front wheels D to relieve them as much as possible of the load.

It will be noted that, since the levers 20 at each side are tied rigidly together by the roll 23 there will result an equalization of the load such that, should one side of the load carrier 51 be loaded heavier than the other, the lifting force of the jack at the more lightly loaded side will be transmitted through the roll to the other side to aid the jack thereat.

The loader may be readily detached from the tractor by disconnecting the pivots 13, removing the belts 21 and 40, and disconnecting the supply lines to the jacks, and then backing the tractor out from between the side frames, which are blocked up to stand alone while thus disconnected.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a tractor mounted loader, a longitudinally extending boom disposed at each side of the tractor, each boom comprising two telescopic sections the rear one of which is pivoted at its rear end on the tractor and supporting the forward section for up and down movements at its forward end, a load carrier supported by the forward ends of the boom, power lift means mounted on the tractor and connected to forward sections of the booms to raise and lower said carrier, said power lift means including a member movable forwardly in response to raising movements of the lift means and connected to the forward section of each boom to extend the same in a forward direction as the carrier is raised.

2. In a tractor mounted loader, a longitudinally extending boom disposed at each side of the tractor, each boom comprising two telescopic sections the rear one of which is pivoted at its rear end on the tractor and supporting the forward section for up and down movements at its forward end, a load carrier supported by the forward ends of the booms, a swinging frame structure supported on the tractor above each boom, and including a power lift actuated member connected to the forward section of the boom to raise the same, each frame structure also including a longitudinally extended push bar connected to said forward section of the boom and movable forwardly during a part of the lifting operation to extend the boom in a forward direction.

3. In a tractor mounted loader, a longitudinally extending boom disposed at each side of the tractor, each boom comprising two telescopic sections the rear one of which is pivoted at its rear end on the tractor and supporting the forward section for up and down movements at its forward end, a load carrier supported by the forward ends of the booms, a swinging frame structure supported above each boom, a hydraulic jack connecting the frame structure and tractor, said frame structures being pivotally supported on the tractor and so connected to forward sections of the booms that the booms may first be swung upwardly a selected distance about their rear end pivots and then the load carrier moved further upward in an arc centered about the pivot supports for said frame structures.

4. A tractor mounted loader comprising in combination, a telescopic boom disposed lengthwise alongside the tractor and pivotally supported at its rear end thereon for up and down movements at its forward end, a substantially triangular lifting frame pivotally supported on the tractor above the boom, said frame comprising a pivoted lever having upper and lower ends, a lifting member connected between the forward end portion of the boom and the upper end of the lever, and a pushing member connected between the said forward end portion of the boom and the lower end of the lever, and power operated means for oscillating the frame about its pivot to lift the boom by said lifting member.

5. A tractor mounted loader comprising in combination, a telescopic boom disposed lengthwise alongside the tractor and pivotally supported at its rear end thereon for up and down movements at its forward end, a substantially triangular lifting frame pivotally supported on the tractor above the boom, said frame comprising a pivoted lever having upper and lower ends, a lifting member connected between the forward end portion of the boom and the upper end of the lever, and a pushing member connected between the said forward end portion of the boom and the lower end of the lever, and power operated means for oscillating the frame about its pivot to lift the boom by said lifting member, the said pushing member having longitudinally slidable portions and operative to push on the boom in a forward direction only after the boom has been lifted to a selected degree.

6. A tractor mounted loaded comprising in combination, a telescopic boom disposed lengthwise alongside the tractor and pivotally supported at its rear end thereon for up and down movements at its forward end, a substantially triangular lifting frame pivotally supported on the tractor above the boom, said frame comprising a pivoted lever having upper and lower ends, a lifting member connected between the forward end portion of the boom and the upper end of the lever, and a pushing member connected between the said forward end portion of the boom and the lower end of the lever, and power operated means for oscillating the frame about its pivot to lift the boom by said lifting member, the said pushing member having two telescoping sections, and adjustable stop means for limiting telescoping action of said sections.

7. A tractor mounted loader comprising in combination, a telescopic boom disposed lengthwise alongside the tractor and pivotally supported at its rear end thereon for up and down movements at its forward end, a substantially triangular lifting frame pivotally supported on the tractor above the boom, said frame comprising a pivoted lever having upper and lower ends, a lifting member connected between the forward end portion of the boom and the upper end of the lever, and a pushing member connected between the said forward end portion of the boom and the lower end of the lever, and power operated means for oscillating the frame about its pivot to lift the boom by said lifting member, and both the lifting and pushing members being selectively adjustable in length.

8. In a tractor mounted loader, a longitudinally extending boom disposed at each side of the tractor, each boom comprising two telescopic sections the rear one of which is pivoted at its rear end on the tractor and supporting the forward section for up and down movements at its forward end, a load carrier supported by the forward ends of the booms, power lift means connected to forward sections of the booms to raise and lower said carrier, and stop means adjustable lengthwise along the rear sections of the booms for engaging rear ends of the forward sections and limiting the telescoping action of the boom.

9. In a tractor mounted loader, a pair of extensible booms disposed one at each side of the tractor and pivotally mounted at their rear ends thereto, and with the forward ends of the booms extending forwardly of the tractor, a load carrier supported by the forward ends of the booms, a power operated lever member fulcrumed on the tractor, a primary connection between the lever member and boom effective, upon initial operation of the lever, to lift the boom and load carrier to a predetermined height, and a secondary connection between the lever member and boom, effective, upon continued operation of the lever, to cooperate with the primary connection to lift the boom and load carrier from said predetermined height and to extend the booms as they are elevated from such height.

10. In a tractor mounted loader, an extensible boom extending forwardly from a pivot connection at the rear of the tractor to a point forwardly of the tractor, a load carrier supported by the forward end of the boom, a power operated lever fulcrumed on the tractor, a lift connection between one end of the lever and the boom, and a connection between the other end of the lever and the boom to extend the latter as it is lifted.

11. In a tractor mounted loader, an extensible boom extending forwardly from a pivot connection at the rear of the tractor to a point forwardly of the tractor, a load carrier supported by the forward end of the boom, a power operated lever fulcrumed on the tractor, a lift connection between one end of the lever and the boom, and a connection between the other end of the lever and the boom to extend the latter as it is lifted, said first mentioned end of the lever being longer, with respect to its fulcrum, than the second mentioned end of the lever.

12. In a tractor mounted loader, an extensible boom extending forwardly from a pivot connection at the rear of the tractor to a point forwardly of the tractor, a load carrier supported by the forward end of the boom, a power operated lever fulcrumed on the tractor, a lift connection between one end of the lever and the boom, and a connection between the other end of the lever and the boom to extend the latter as it is lifted, said lift connection being adjustable as to length.

13. In a tractor mounted loader, an extensible boom extending forwardly from a pivot connection at the rear of the tractor to a point forwardly of the tractor, a load carrier supported by the forward end of the boom, a power operated lever fulcrumed on the tractor, a lift connection between one end of the lever and the boom, and a connection between the other end of the lever and the boom to extend the latter as it is lifted, said second mentioned connection between the lever and boom comprising a push bar that is adjustable as to length.

14. In a tractor mounted loader, a boom extending lengthwise of the tractor from a pivot connection therewith and to a point forwardly thereof, a load carrier on the front end of the boom, a lever fulcrumed at a point between its ends on the tractor for movement in a longitudinal vertical plane, a lift connection between one end of the lever and boom, and a connection between the other end of the lever and the boom operative to extend the boom as it is lifted.

15. In a tractor mounted loader, a boom extending lengthwise of the tractor from a pivot connection therewith and to a point forwardly thereof, a load carrier on the front end of the boom, a lever fulcrumed at a point between its ends on the tractor for movement in a longitudinal vertical plane, a lift connection between one end of the lever and the boom, and a connection between the other end of the lever and the boom operative to extend the boom as it is lifted, said lift connection being adjustable as to length.

16. In a tractor mounted loader, a boom extending forwardly from a pivot connection with the tractor, said boom having front and rear slidably connected sections, a load carrier supported by the forward boom section, a lever fulcrumed on the tractor, a hydraulically operated device mounted on the tractor and connected with the lever to operate the same, a lift connection between the lever and boom to lift the boom, and a second connection between the lever and boom to project the forward section of the boom with respect to the rear section.

17. In a tractor mounted loader, a boom extending forwardly from a pivot connection with the tractor, said boom having front and rear slidably connected sections, a load carrier supported by the forward boom section, a lever fulcrumed on the tractor, a hydraulically operated device mounted on the tractor and connected with the lever to operate the same, a lift connection between the lever and boom to project the forward section of the boom with respect to the rear section, said second connection having a lost motion whereby it will not project the forward section of the boom until the load carrier has been lifted to a predetermined height.

18. In a tractor mounted loader, a boom extending forwardly from a pivot connection with the tractor, said boom having front and rear slidably connected sections, a load carrier supported by the forward boom section, a lever fulcrumed on the tractor, a hydraulically operated device mounted on the tractor and connected with the lever to operate the same, a lift connection between the lever and boom to lift the boom, and a second connection between the lever and boom to project the forward section of the boom with respect to the rear section, said second connection including telescopically connected push bars and a stop for limiting the telescopic action in one direction.

PAUL P. WUERTZ.
ELMER J. WUERTZ.